Nov. 30, 1965 TOHCHUNG WEI 3,220,541

MULTI DISH HOLDER FOR STACKED COOKERS

Filed Feb. 10, 1964 2 Sheets-Sheet 1

INVENTOR
Tohchung Wei
BY Plachek Pulsbury
ATTORNEYS

United States Patent Office 3,220,541
Patented Nov. 30, 1965

3,220,541
MULTI DISH HOLDER FOR STACKED COOKERS
Tohchung Wei, 169 E. Broadway, New York, N.Y.
Filed Feb. 10, 1964, Ser. No. 343,783
1 Claim. (Cl. 206—4)

This invention concerns stacked food vessels and more particularly concerns stacked food dishes inserted into an insulated cooking vessel. The invention constitutes a scientific advance and achievement in the art.

According to the invention a plurality of cylindrical dishes, cups or the like are inserted into a cylindrical holder which is axially inserted into a cylindrical vessel. The cylindrical vessel has insulated walls and the cylindrical holder is spaced from the walls so that heated or chilled water can surround the holder to heat or cool the contents of the stacked dishes. Each of the dishes or cups has a retractable handle so that the dishes fit compactly inside the holder. The cylindrical holder has an attached insulated, removable cover with a handle so that all the dishes can be simultaneously inserted and removed from the cooking vessel. A plurality of vessels can be arranged in an axially aligned stack with one or more of the vessels containing stacked food dishes.

It is therefore a principal object of the invention to provide an assembly of stacked food dishes for a cylindrical cooking vessel.

Another object is to provide a cylindrical holder with a plurality of stacked food dishes and an attached, detachable cover for inserting the holder and dishes as a unit into an insulated cooking vessel, and for removing the dishes as a unit.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
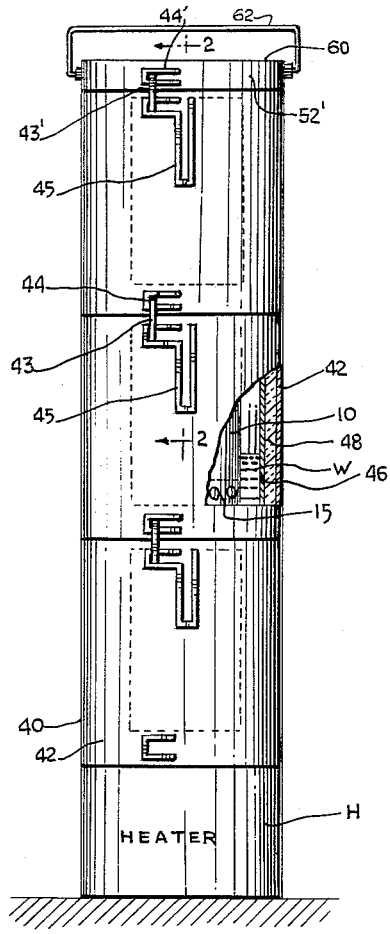
FIG. 1 is a side elevational view of a stack of cooking vessels, according to the invention, with part broken away.

Referring to the drawings, there is shown in FIGS. 1–4 a cylindrical sheet metal holder 10 which serves to contain a stack of cylindrical cup-like food dishes 12a, 12b and 12c. The holder 10 has a circular bottom wall 14 elevated above the bottom edge of the cylindrical wall of the holder. The cylindrical skirt 15 defined below wall 14 has a series of circumferentially spaced holes 16 for a purpose to be described. The upper end of holder 10 is open and has two bayonet slots or notches 18 spaced diametrically apart. These slots receive bayonet pins 19 extending diametrically outward of a flat disk-like cover 20. The cover 20 is preferably made of sheet metal as a hollow shell filled with a lightweight thermal insulation material 22 such as wood, cork, fiber glass, foam plastic, etc. A handle 23 is provided on the top of the cover. At the underside of the cover is a circular resilient sealing gasket 24 made of natural or artificial rubber or plastic. The gasket is secured by a central rivet 25 to the cover.

Figure 2:
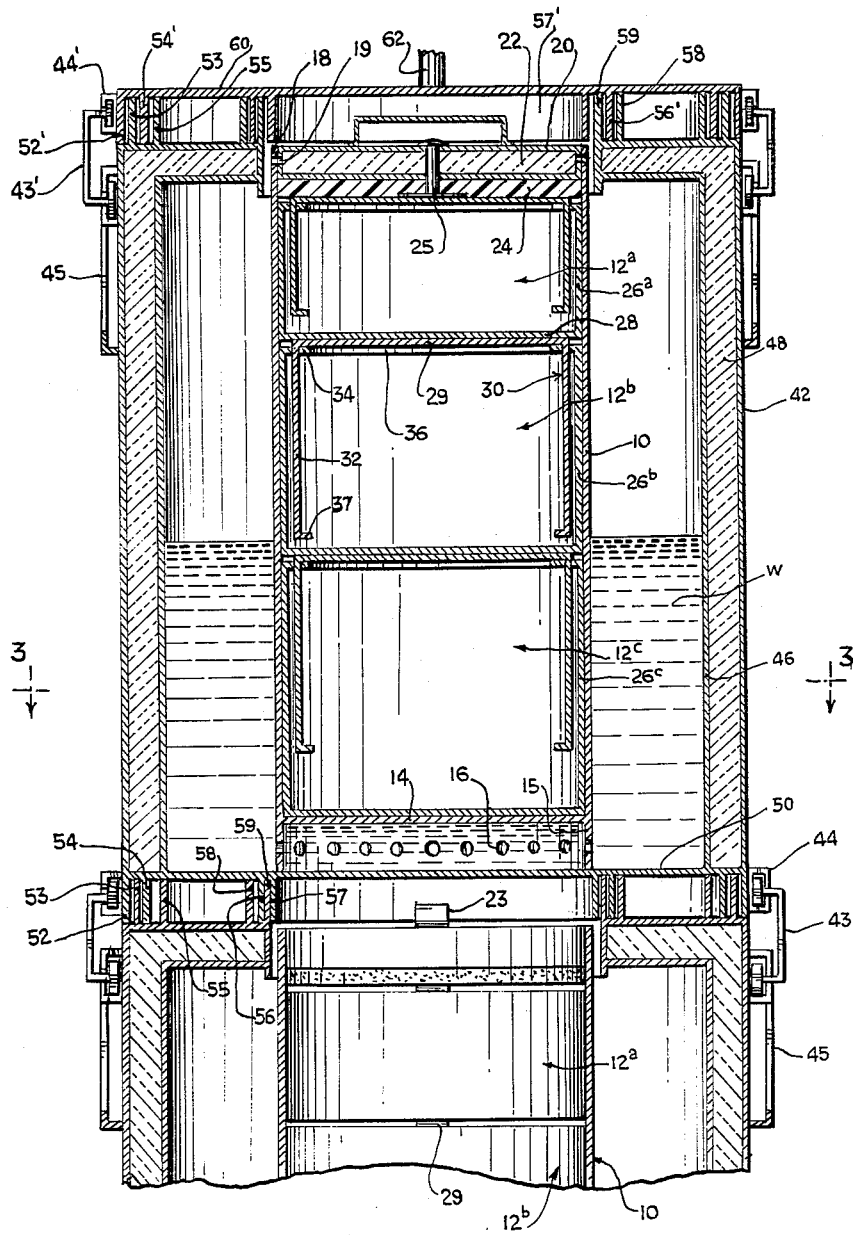
FIG. 2 is an enlarged sectional view taken on line 2—2 of FIG. 1, showing a stacked dish and holder assembly according to the invention.

Each of the food dishes 12a, 12b and 12c has a cylindrical sheet metal side wall 26a, 26b or 26c. The diameter of this wall is slightly less than that of the interior of the cylindrical holder 10 so that the food dishes can slide axially into and out of the holder without binding. Each dish has a flat circular bottom 28 which rests on a flat top 29 of a U-shaped handle 30 provided for each dish. Each handle 30 is made from a strip of metal or plastic material. Extending downwardly from opposite ends of the flat top 29 of each handle are two legs 32. These legs extend slidably through slots 34 formed in diametrically opposite positions on an annular flange 36 extending radially inward of the upper edge of each cylindrical wall 26a, 26b and 26c. Two projections 37 are provided at the bottom ends of the legs 32. These projections extend radially inward of the dish toward each other to lock the handle at the flange 36 when the handle is extended to carrying position as shown for dish 12a in FIG. 4. Normally the handles are retracted so that top 29 of each handle overlays the flange 36 of each dish. The dishes may have different axial lengths. All the dishes fit compactly inside the cylindrical holder 10 as shown in FIG. 2, with the handles retracted inside each dish. Gasket 24 then rests on the retracted handle of disk 12a and the cover 20 is detachably engaged inside the open top of the holder 10.

Figure 3:
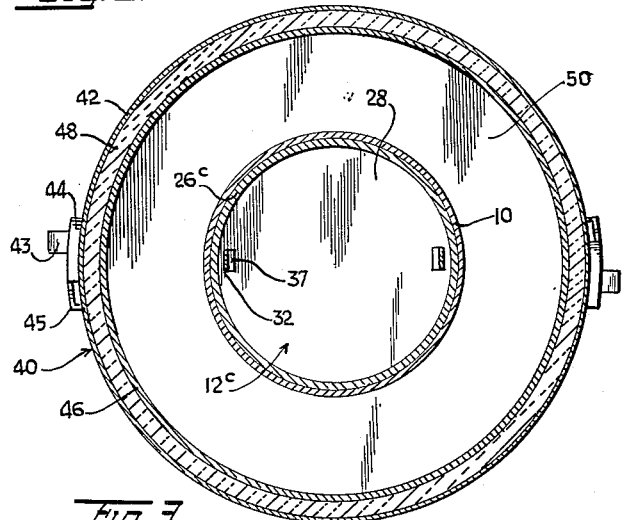
FIG. 3 is a cross-sectional view on a reduced scale taken on line 3—3 of FIG. 2.
Figure 4:
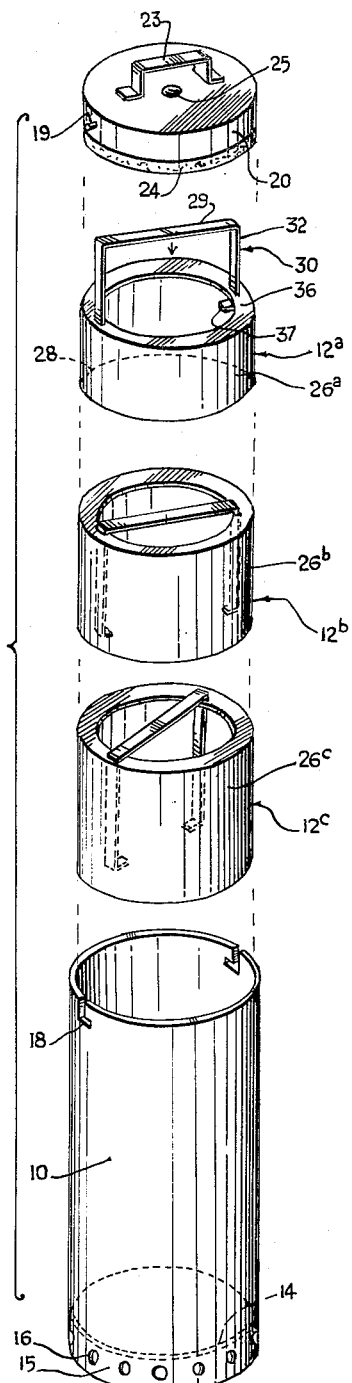
FIG. 4 is an exploded perspective view on a scale reduced from that of FIG. 3, showing parts of a dish stack and holder assembly.

The holder and dishes are especially intended for use with an assembly of stacked cylindrical food vessels 40 as shown in FIGS. 1–3. Each of these food vessels has an outer cylindrical sheet metal wall 42. The vessels are detachably secured together by coupling links 43 slidably engaged in keepers 44, 45 on the axially aligned vessels. Each vessel has an inner cylindrical wall 46 spaced from wall 42. A lightweight thermal insulation filling 48 is interposed between walls 42 and 46. The vessel has a flat bottom wall 50. Each vessel can be filled with hot or cold water W to keep the holder 10 and dishes 12a–12c in a heated or chilled condition. A heater H may be used to heat the vessels.

The holder 10 rests on the bottom wall 50 of each vessel 40. The flat bottom 14 of each holder 10 is spaced from wall 50 by the axial length of skirt 15. Holes 16 freely admit water under the holder 10 and facilitate circulation of water under the holder.

The bottom of each vessel is preferably provided with outer radially spaced depending cylindrical flanges 52, 54 which interfit with upwardly extending radially spaced outer flanges 53, 55 at the top of the next lower vessel. Further inner radially spaced depending cylindrical flanges 56, 57 interfit with upwardly extending inner cylindrical flanges 58, 59 of the next lower vessel. Flanges 57, 59 or 57', 59 surround the upper end of holder 10 in each vessel.

The vessel assembly may be provided with a circular sheet metal cover 60 having a carrying handle 62. The cover is detachably engaged with the uppermost vessel by links 43' and keepers 44', 45. Depending cylindrical flanges 52', 54', 56', 57' integral with the top of the cover interfit with the upwardly extending radial flanges 53, 55, 58 and 59, respectively, of the uppermost vessel 40.

There is thus provided a hermetically sealed insulated assembly of detachably engaged cylindrical vessels with stacks of dishes centrally located inside the vessels. By grasping handle 23 any holder 10 with its stack of dishes can easily be removed from and placed in any vessel. The dishes are easily removed by removing cover 20 and taking out the dishes one by one. The vessels are easily disengaged to provide access to the stacks of dishes. The entire sealed assembly can be transported as a unit from a kitchen or other location where the vessels are heated to another location where the food in the dishes is to be consumed. The food is kept at desirable temperatures in heated or chilled condition.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A food vessel assembly, comprising a plurality of cylindrical vessels, each of said vessels having spaced concentric inner and outer cylindrical walls with thermal insulation therebetween, and a flat bottom, means detachably securing the vessels together in axial alingment, said vessels having interfitting cylindrical flanges at opposite ends thereof hermetically sealing the vessels, a cylindrical holder in each vessel, said holder being radially spaced from and concentric with said inner wall to define a compartment for containing water at a certain temperature, said holder having an open top and closed circular bottom, a perforated skirt depending from the periphery of said closed bottom whereby water from the compartment cools the closed circular bottom, a removable cover detachably secured to the open top of and closing said holder, said cover being a hollow member filled with thermal insulation material having a resilient sealing gasket at its underside, and a plurality of cup-like dishes disposed in axial alignment inside said holder, said dishes being of axially different lengths, each of said dishes having a cylindrical side wall with a closed circular bottom and open top, a flat annular flange extending radially inward of the open top of said cylindrical side wall, said annular flange having diametrically opposed openings therein, and a U-shaped handle having legs slidably engaged in the respective openings in the annular flange, said handle having a bight extending across upper ends of the legs outside of said dish and inwardly extending projections on other ends of the legs inside said dish to retain the handle on said dish, whereby the handle is retractable inside said dish with said bight contacting said annular flange, and whereby the handle is extensible outside of said dish with said projections engaged underneath said annular flange at said openings, the means for detachably securing the vessels together in axial alignment including coupling links slidably engaged in keepers.

References Cited by the Examiner
UNITED STATES PATENTS

| | | |
|---|---|---|
| 230,274 | 7/1880 | Haskell. |
| 1,323,473 | 12/1919 | Hettinger _____ 126—377 |
| 2,026,967 | 1/1936 | Devine. |
| 2,636,663 | 4/1953 | Hauck _____ 220—95 X |
| 2,838,044 | 6/1958 | Wei _____ 126—369.3 |

FREDERICK L. MATTESON, Jr., *Primary Examiner.*

CHARLES J. MYHRE, *Examiner.*